United States Patent Office 2,723,972
Patented Nov. 15, 1955

2,723,972

HOMOCYSTEINYL HETERODIPEPTIDES

Elbert C. Herrick, Boothwyn, and Charles W. Todd, Delaware County, Pa., assignors to E. I. du Pont de Nemours & Company, Wilmington, Del., a corporation of Delaware No Drawing. Application April 28, 1954,
Serial No. 426,286

12 Claims. (Cl. 260—112)

This invention relates to peptides. More particularly, it relates to synthetic heterodipeptides and to a method for their preparation.

Naturally occurring heteropolypeptides, i. e., polypeptides built up from more than one amino acid, have great biological importance. For example, such natural polypeptides as insulin, glutathione, penicillin, oxytocin, and streptogenin exhibit biological activity as hormones, antibiotics, and growth promoters. Markedly varied biological activities are attendant upon slight variations in the structure of such materials.

This invention has as an object the provision of new heterodipeptides. A further object is the provision of novel materials of new and/or improved biological properties. Other objects will appear hereinafter.

These objects are accomplished by the present invention of the dipeptides of homocysteine and another open-chain α-amino acid, derivatives of these dipeptides in which carboxyl groups are protected by ester or amide groups, amino groups by amide including carbamate groups, and thiol groups by groups which can be removed by hydrolysis or by reduction, i. e., thioester and benzyl-thioether groups, and the disulfides and salts of such dipeptides.

An especially preferred group of heterodipeptides included in this invention is that having the general formula

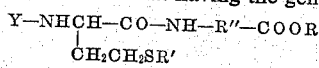

wherein Y is acyl,

including a group of the formula

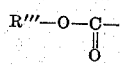

R is hydrogen or a monovalent hydrocarbon radical, R' is hydrogen or a group hydrolyzable or hydrogenolyzable thereto, i. e., benzyl or acyl groups, R'' is a gem-divalent hydrocarbon radical, i. e., a divalent hydrocarbon radical having its two free valences stemming from the same carbon and R''' is a monovalent hydrocarbon radical, and their salts and disulfides. This group of homocysteinyl dipeptides is especially useful for the synthesis of biologically active tripeptides as described in U. S. application Serial Number 426,559, filed April 29, 1954, by us. In this synthesis the suitably protected dipeptides of homocysteine (a) with glycine or (b) with glutamic acid or aspartic acid are reacted with the suitably protected derivatives of (a) glutamic acid or aspartic acid or (b) glycine, by the methods herein given for dipeptide formation.

It is convenient in preparing the dipeptides of this invention to use protected amino acids, i. e., amino acids having the amino or carboxyl groups which are not to be coupled in the peptide linkage, and any thiol group protected by conversion to carbamate or amide, ester, or thioester or benzylthioether groups, respectively. The suitably protected homocysteine or other open-chain α-amino acid which is to be formed into a dipeptide is converted to a mixed anhydride with an alkylcarbonic acid or a carboxylic acid, which is then reacted with the other protected open-chain α-amino acid or protected homocysteine, respectively. After the dipeptides of the protected amino acids are formed, the protecting groups can be removed, if desired, to obtain the dipeptides with free amino, thiol, or carboxyl groups. Furthermore, the resultant dipeptides can be converted to disulfides, or to salts of the thiol, amino, or carboxyl groups.

In a preferred manner of preparing the dipeptides of this invention, a mixed anhydride of a protected open-chain α-amino acid with an alkylcarbonic acid is employed. For example, the mixed anhydride of N-carbobenzyloxy-S-benzyl-DL-homocysteine and a monoalkyl carbonate is prepared by reacting in a substantially anhydrous inert solvent, e. g., toluene, chloroform, or dioxane, the homocysteine derivative with the theoretical or a slight excess over the theoretical amount of the alkyl chloroformate, e. g., a 10% excess of sec. butyl chloroformate, in the presence of an acid acceptor such as triethylamine. The reaction temperature is maintained between −20° and +15° C., preferably at −5° to 0° C. This method is based on that described by Vaughan and Osato, J. Am. Chem. Soc., 74, 676 (1952). Higher reaction temperatures may be used, if desired. To the resulting solution of the mixed anhydride is added an equivalent amount of a protected open-chain amino acid, or its salt, e. g., ethyl glycinate hydrochloride dissolved in an inert solvent, e. g., chloroform, and the theoretical amount, or a slight excess, of a tertiary amine, e. g., a 10% excess of triethylamine. The addition of the amino acid ester and the tertiary amine to the mixed anhydride is regulated so that the temperature of the reaction mixture can be held at about −5° C. Reaction is continued at this temperature for a period of one to two hours and then the reaction mixture is allowed to warm to room temperature, approximately 20° to 30° C., during sixteen hours. The white precipitate which forms during the reaction is dissolved by addition of water. The organic layer is then separated and after being washed with dilute sodium bicarbonate solution and distilled water is dried and concentrated at 50° C. under reduced pressure, e. g., at 15 to 25 mm. of mercury. The resulting thick syrup crystallizes upon addition of a small amount of ethyl acetate and hexane, yielding the dipeptide, ethyl N-carbobenzyloxy-S-benzyl-DL-homocysteinylglycinate.

The blocking groups on protected dipeptides can be removed by various methods. For example, dipeptides having N-carbobenzyloxy groups are readily freed from the carbobenzyloxy group by treatment of the dipeptide with dry hydrogen halide, e. g., hydrogen bromide, in glacial acetic acid. The hydrogen bromide-glacial acetic acid treatment is carried out at room temperature when the dipeptide has a free carboxyl group. However, when the carboxyl group of the dipeptide is protected by an ester group, the hydrogen bromide-acetic acid treatment is carried out at a temperature of 5° to 15° C. This treatment results in the formation of the hydrobromide of the dipeptide. However, the free amino group can be obtained from the hydrobromide ester by treatment with methyl alcoholic sodium hydroxide. This procedure for the cleavage of N-carbobenzyloxy groups from protected amino acids is described in greater detail in J. Org. Chem., 17, 1564 (1952). The dipeptide ester can be converted to the free acid by saponification with alcoholic sodium hydroxide, followed by acidification with an inorganic acid.

A convenient starting point for homocysteinyl dipeptides of this invention is DL-methionine which is commercially available. DL-methionine can be converted to S-benzyl-DL-homocysteine by a modification of a method described in J. Biol. Chem., 173, 471 (1948) involving transetherification with benzyl chloride in the presence of hydrochloric acid. The amino group in S-benzyl-DL-homocysteine is conveniently protected by reaction with benzyl chloroformate in aqueous sodium hydroxide at a temperature of 0 to 5° C.

The optically inactive mixture of the enantiomorphs of homocysteine can be separated into the D- and the L-isomers by the method of du Vigneaud, J. Biol. Chem., 180, 571 (1949).

The invention is illustrated in further detail by the following examples.

*Example I.—Ethyl N-carbobenzyloxy-S-benzyl-DL-homocysteinylglycinate*

A. S-BENZYL-DL-HOMOCYSTEINE

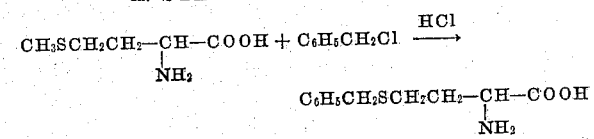

A reaction vessel fitted with a mechanical stirrer and a reflux condenser is charged with a solution of 105 g. (0.7 mole) of DL-methionine in 300 ml. of 50 volume per cent concentrated hydrochloric acid and 133.5 g. (1.05 mole) of benzyl chloride. The mixture is refluxed and stirred mechanically for 40 hours, at which time a dark brown oil layer is still present on the top. The mixture is concentrated to about one-third its original volume at 50–60° C. at reduced pressure (about 15 mm. mercury) and neutralized with saturated sodium carbonate solution. The white precipitate which forms is separated by filtration of the hot solution and is washed with three 100-ml. portions of hot water to remove unreacted DL-methionine. The precipitate is then washed with benzene and with denatured alcohol to remove the oily by-product. The product is recrystallized from boiling water, about 4 to 5 g. dissolving in one liter. The recrystallized S-benzyl-DL-homocysteine amounts to 51.7 g. (66.5% yield based on 49.5% conversion) and melts at about 246° C., with decomposition. Unreacted DL-methionine obtained by concentration of the aqueous filtrate amounts to 53 g.

The following analytical data are obtained on a sample prepared in essentially the same manner.

*Analysis.*—Calculated for $C_{11}H_{15}O_2NS$: N, 6.22%; S, 14.25%. Found: N, 5.67%, 5.74; S, 14.10%, 14.19.

The S-benzyl-DL-homocysteine was resolved into its antipodes by acetylation, papain resolution and hydrolysis. The optical rotation of the S-benzyl-L-homocysteine was $[\alpha]_D^{25} = +21.6°$ at 1% solution in 1N HCl. The rotation of the D compound was $-23°$.

B. N-CARBOBENZYLOXY-S-BENZYL-DL-HOMOCYSTEINE

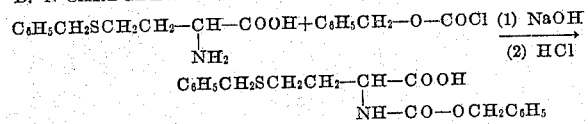

A reaction vessel fitted with two dropping funnels and a mechanical stirrer and cooled in an ice bath is charged with 18.0 g. (0.08 mole) of S-benzyl-DL-homocysteine and 40 ml. (0.08 mole) of 2N sodium hydroxide. From separate dropping funnels, 15.3 g. of benzyl chloroformate (0.09 mole) and 50 ml. (0.1 mole) of 2N aqueous sodium hydroxide solution are added in five portions during a period of 65 minutes. The reaction mixture is maintained at ice bath temperature and stirred vigorously for another one-half hour following completion of addition of reactants. The white, gelatinous precipitate which is present at pH 11 indicates that the sodium salt is insoluble under these conditions. The reaction mixture is acidified to Congo red paper with about 10 ml. of concentrated hydrochloric acid. A hard, white precipitate forms at once. This precipitate, separated by filtration and then dried, amounts to 27.4 g., corresponding to a yield of 95.5%. The crude product is dissolved in 200 ml. of ethyl acetate and then filtered, leaving a residue of 1.3 g. of unreacted S-benzyl-DL-homocysteine. The ethyl acetate solution is diluted with an approximately equal volume of hexane whereupon N-carbobenzyloxy-S-benzyl-DL-homocysteine crystallizes. There is obtained 20.5 g., melting at 115.5–117° C., corresponding to a yield of 71.5%. A portion of this product recrystallized from ethyl acetate/hexane does not change in melting point.

*Analysis.*—Calculated for $C_{19}H_{21}O_4NS$: N, 3.90%; S, 8.92%. Found: N, 3.93%, 3.97; S, 9.01%, 9.05.

The corresponding D- and L- N-carbobenzyloxy-S-benzyl homocysteines are similarly prepared and melt at 86–87° C. and 85–88° C. respectively and have $[\alpha]_D^{25}$ of $+12.15°$ and $-11.7°$ respectively at 1½% concentration in absolute ethanol.

C. ETHYL N-CARBOBENZYLOXY-S-BENZYL-DL-HOMOCYSTEINYLGLYCINATE

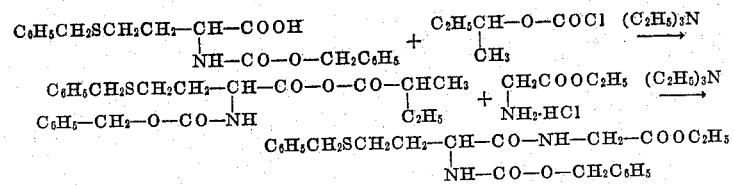

A reaction vessel fitted with a mechanical stirrer and cooled by an ice bath is charged with 14.4 g. (0.04 mole) of N-carbobenzyloxy-S-benzyl-DL-homocysteine, 150 ml. of toluene, and 4.05 g. (0.04 mole) of redistilled triethylamine. The solution is cooled to $-5°$ C. and then 6.0 g. (0.044 mole, 10% excess) of sec.-butyl chloroformate is added. The reaction mixture is maintained at $-5°$ C. and stirred for 40 minutes with a slight cloudiness resulting. A solution of 5.58 g. (0.04 mole) of ethyl glycinate hydrochloride dissolved in 100 ml. of chloroform and 4.46 g. (0.044 mole, 10% excess) of triethylamine (redistilled) is added. This solution of the ester is added to the mixed anhydride (in solution in toluene) during 17 minutes at a rate sufficient to maintain the temperature at $-5°\pm2°$ C. A white precipitate forms and it increases in quantity as addition progresses. The reaction mixture is stirred 1.5 hours after addition is complete, while the temperature is maintained at $-5°$ C. The mixture is allowed to come to room temperature overnight. The white precipitate dissolves upon addition of 100 ml. of water. The organic layer is separated and washed with two 75-ml. portions of 3% aqueous sodium bicarbonate and 75 ml. of distilled water. The organic layer is dried over anhydrous magnesium sulfate and concentrated at 50° C. at a pressure of 15–25 mm. of mercury. The thick syrup crystallizes upon addition of a small amount of a mixture of ethyl acetate and hexane. The product melts at 83–88° C. On recrystallization from ethyl acetate/hexane mixture, the ethyl N-carbobenzyloxy-S-benzyl-DL-homocysteinylglycinate melts at 89–91° C. and amounts to 10.5 g. (59% of theory). An analytical sample, after two recrystallizations from ethyl acetate/hexane mixture, melts at 94–94.5° C.

*Analysis.*—Calculated for C₂₃H₂₈O₅N₂S: N, 6.30%; S, 7.21%. Found: N, 6.14%, 6.03; S. 7.70%, 7.04.

The corresponding D- and L-derivatives of ethyl N-carbobenzyloxy-S-benzylhomocysteinylglycinate are similarly prepared and melt at 94° C. and 99–100° C. respectively and have $[\alpha]_D^{25}$ of +14.6° and −16.3° respectively at 1½% concentration in absolute ethanol.

*Example II.—N-carbobenzyloxy-S-benzyl-DL-homocysteinylglycine*

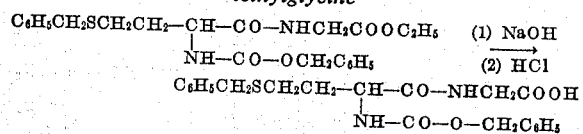

A reaction vessel is charged with 10.5 g. (0.0226 mole) of ethyl N-carbobenzyloxy-S-benzyl-DL-homocysteinylglycinate, 25.2 ml. (0.0252 mole, 10% excess) of 1N aqueous sodium hydroxide and 100 ml. of methanol. The solution is allowed to stand at room temperature (about 25° C.) for 1¼ hours. The methanol is then removed from the mixture by distillation under reduced pressure. The absence of a precipitate at this stage indicates that all the ester has reacted. The solution is acidified to Congo red paper with 27 ml. of 1N hydrochloric acid. An oil separates which soon crystallizes to a hard, white solid. After recrystallization from ethyl acetate/hexane mixture, there is obtained 6.5 g., corresponding to a 69% yield, of N-carbobenzyloxy-S-benzyl-DL-homocysteinylglycine, melting at 142.5–143° C. An analytical sample, after two recrystallizations from ethyl acetate/hexane mixture, melts at 143.5–144° C.

*Analysis.*—Calculated from C₂₁H₂₄O₅N₂S: N, 6.73%; S, 7.70%. Found: N, 6.65%, 6.62; S. 7.78%, 7.56.

*Example III.—S-benzyl-DL-homocysteinylglycine hydrobromide*

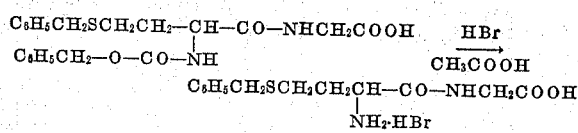

Anhydrous hydrogen bromide is passed into 40 ml. of glacial acetic acid until there is no further temperature rise, about one hour being required. To this solution is added 2.08 g. (0.005 mole) of N-carbobenzyloxy-S-benzyl-DL-homocysteinylglycine. There is an immediate vigorous evolution of carbon dioxide. After standing for 1½ hours, the solution is diluted with 100 ml. of anhydrous diethyl ether and placed in a refrigerator at about 3° C. to crystallize. The crystalline product is separated by filtration and it amounts to 1.71 g., corresponding to a 94% yield. This S-benzyl-DL-homocysteinylglycine hydrogen bromide is obtained in two crops of crystals, the first crop, amounting to 1.50 g., melting at 145.5–147.5° C., and the second crop, amounting to 0.21 g., melting at 147–148° C.

*Analysis.* — Calculated for C₁₃H₁₈O₃N₂S·HBr: N, 7.71%; Br, 22.0%. Found: N, 7.70%, 7.82; Br, 22.64%, 23.22.

*Example IV.—S-benzyl-DL-homocysteinylglycine*

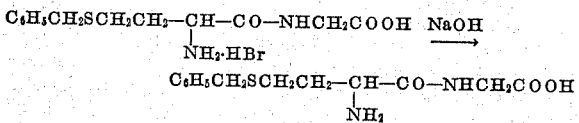

The S-benzyl-DL-homocysteinylglycine hydrobromide of Example III is dissolved in 5–10 ml. of water and 1N aqueous sodium hydroxide solution is added until the solution is just acid to Congo red paper. S-benzyl-DL-homocysteinylglycine precipitates, and there is obtained 0.85 g., corresponding to an 89.5% yield.

The S-benzyl-DL-homocysteinylglycine can be obtained directly from the N-carbobenzyloxy dipeptide without isolation of the hydrobromide, if desired, by the following procedure. One hundred milliliters of glacial acetic acid is saturated with dry hydrogen bromide, cooled to 10° C., and 8.33 g. (0.02 mole) of N-carbobenzyloxy-S-benzyl-DL-homocysteinylglycine is added. No carbon dioxide is evolved until the temperature of the mixture is raised to 12°–15° C., whereupon copious gas evolution takes place. After stirring for ½ hour at 12°–15° C., the solution is filtered to remove insoluble particles. The filtrate is concentrated at about 40° C. and under reduced pressure to a volume of about 30 ml. The resultant gummy residue is triturated with 100 ml. of diethyl ether. The solid residue, still containing some acetic acid, is dissolved in 50 ml. of water and the solution decolorized by treatment with activated carbon. On standing overnight, a precipitate forms. This precipitate is dissolved in hot water, filtered and the filtrate made just acid to Congo red paper with 1N aqueous sodium hydroxide. S-benzyl-DL-homocysteinylglycine precipitates in a yield of 4.3 g. (76% of theory). The product melts at 211–212° C.

*Example V.—Ethyl S-benzyl-DL-homocysteinylglycinate hydrobromide*

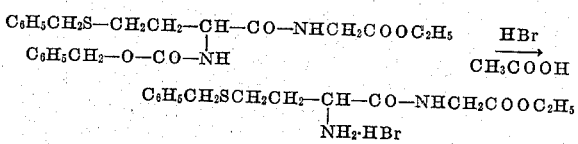

Fifty milliliters of glacial acetic acid is saturated with dry hydrogen bromide as described in Example III. To the resulting solution is added 4.45 g. (0.01 mole) of ethyl N - carbobenzyloxy - S - benzyl-DL-homocysteinylglycinate in one portion. The temperature rises from 6° to 16° C., and a copious evolution of carbon dioxide takes place. The solution is stirred for twelve minutes at 5° C. and then concentrated under reduced pressure (about 25 mm. of mercury) to a volume of about 5 ml. The residue is triturated several times with diethyl ether and the solid is recrystallized from methylene chloride/hexane mixture. The recrystallized solid is ethyl S-benzyl-DL-homocysteinylglycinate hydrobromide. It amounts to 3.67 g., corresponding to a yield of 93.5%, and has a melting point of 134–135° C.

*Analysis.*—Calculated for C₁₅H₂₃N₂O₃SBr: N, 7.16%; Br, 20.42%. Found: N, 7.14%, 6.96; Br, 21.15%, 21.61.

S-benzyl-DL-homocysteinylglycine can be obtained from the ethyl S-benzyl-DL-homocysteinylglycinate hydrobromide of Example V by saponification with methyl alcoholic sodium hydroxide, followed by acidification to Congo red paper with 1N hydrochloric acid. An 89% yield of S-benzyl-DL-homocysteinylglycine having a melting point of 208° C. is obtained in this way.

*Example VI.—DL-homocysteinylglycine, mercuric salt*

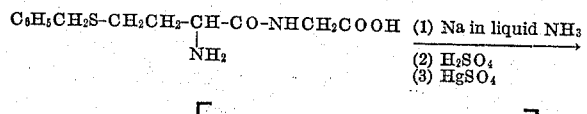
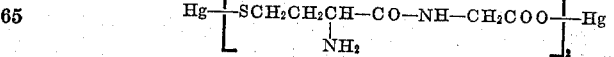

A glass reaction vessel is flame dried, and then cooled under nitrogen. About 90 ml. of liquid ammonia (commercial grade) is distilled from sodium into the reaction vessel, and 1.84 g. (0.0065 mole) of S-benzyl-DL-homocysteinylglycine is added to the ammonia. When the solid dissolves, sodium is added in portions until a deep blue color persists, 0.45 g. (0.195 mole) being required. The solution is stirred for 20 minutes and 2.74 g. of ammonium sulfate and 0.15 g. of ammonium chloride are added. The mixture is stirred in a solid carbon dioxide/acetone bath for fifteen minutes, then the ammonia is evaporated at room temperature. The dry residue is dissolved in 20 ml. of 0.5N sulfuric acid. Mercuric sulfate reagent, prepared as described in Biochemical Preparations 2, 88 (1952) is then added until there is no further precipitate. The precipitate, the mercuric salt of DL-homocysteinylglycine, is isolated by centrifugation and washed with five 20-ml. portions of ice cold 0.5N sulfuric acid. The solid is then washed with twenty-one 15 ml. portions of oxygen-free water.

*Example VII.—DL-homocysteinylglycine*

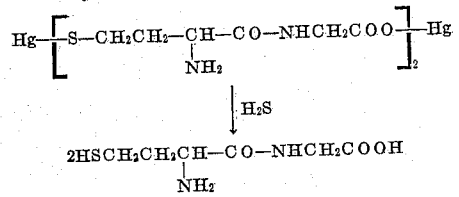

The mercuric salt of Example VI is suspended in 25 ml. of oxygen-free water and hydrogen sulfide is passed into the solution for three hours. The mercuric sulfide which forms is removed by filtration through a pressure filter under a nitrogen atmosphere. The solution containing the dipeptide is freed from hydrogen sulfide by bubbling nitrogen through the solution. The solution is lyophilized i. e., dried from the frozen state (Neurath and Bailey: "The Proteins" (1953), vol. 1, Part A, page 31) and analytical data on the solid residue indicates the presence of inorganic sulfate. The residue is redissolved in oxygen-free water and inorganic sulfate is precipitated with barium hydroxide. Excess barium is removed by addition of 0.1N sulfuric acid. The mixture is filtered and the solution is lyophilized. The DL-homocysteinylglycine obtained amounts to about 0.8 g.

*Analysis.*—Calculated for $C_6H_{12}N_2SO_3 \cdot H_2O$: C, 34.27%; H, 6.72%; N, 13.33%. Found: C, 34.43%; H, 6.48%; N, 13.15%.

*Example VIII.—Methyl N-carbobenzyloxy-S-benzyl-DL-homocysteinylglycinate*

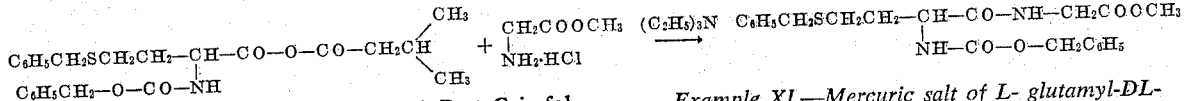

The procedure described in Example I, Part C is followed except that methyl glycinate is used instead of the ethyl ester, and isobutyl chloroformate instead of sec.-butyl chloroformate. All the reagents are used in amounts five times greater than those given in that example. The methyl N-carbobenzyloxy-S-benzyl-DL-homocysteinylglycinate obtained amounts to 40.5 g. (47% of theory), M. P. 87–88° C.

*Analysis.*—Calculated for $C_{22}H_{26}N_2SO_5$: N, 6.51%; S, 7.45%. Found: N, 6.39%; S, 7.46%.

*Example IX.—Methyl S-benzyl-DL-homocysteinyl-glycinate·hydrobromide*

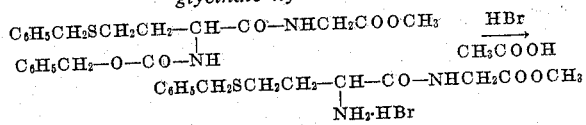

The procedure described in Example III is followed, with the substitution of an equivalent amount of methyl N-carbobenzyloxy-S-benzyl-DL-homocysteinylglycinate for the N-carbobenzyloxy-S-benzyl-DL-homocysteinylglycine of that example. The methyl S-benzyl-DL-homocysteinylglycinate hydrobromide obtained amounts to 21.5 g. (71% of theory).

*Analysis.*—Calculated for $C_{14}H_{21}N_2SO_3Br$: N, 7.44%. Found: N, 7.38%.

*Example X.—N - carbobenzyloxy-L-α-glutamyl-S-benzyl-DL-homocysteine*

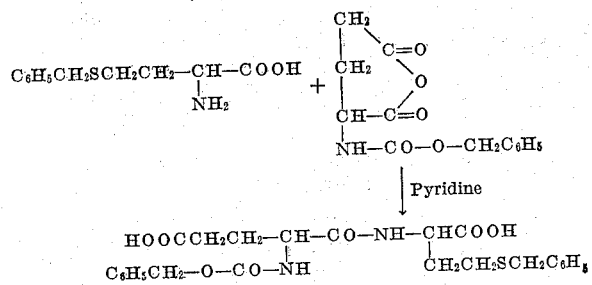

A suspension is made of 4.5 g. (0.02 mole) of S-benzyl-DL-homocysteine in 70 ml. of anhydrous pyridine. N-carbobenzyloxyglutamic anhydride, 5.25 g. (0.02 mole), is added in ten portions during 30 minutes. The mixture is stirred for 1½ hours and is then allowed to stand at room temperature overnight. The solution is stirred an additional 1½ hours and filtered. The pyridine is removed from the filtrate under reduced pressure at 50° C. The residue is diluted by addition of water and 1N aqueous sodium hydroxide, and then neutralized with 3N hydrochloric acid. The precipitate which forms is a mixture of the alpha and gamma isomers, and it is separated by filtration, and then dissolved in ethyl acetate. These isomers are separated by fractional extraction with aqueous sodium bicarbonate. The ethyl acetate solution is extracted with eight 20-ml. portions, each containing 0.24 g. of sodium bicarbonate. Each fraction is acidified with 1N hydrochloric acid, which causes oils to precipitate. After standing at 2–4° C. a solid forms in fractions 5, 6, and 7. These solid fractions are combined and recrystallized from ethyl acetate/hexane. The product is N-carbobenzyloxy-L-α-glutamyl-DL-homocysteine, and it amounts to 0.77 g.

*Analysis.*—Calculated for $C_{24}H_{28}N_2SO_7$: C, 59.00%; H, 5.78%; N, 5.74%. Found: C, 59.16%; H, 6.02%; N, 5.71%.

*Example XI.—Mercuric salt of L- glutamyl-DL-homocysteine*

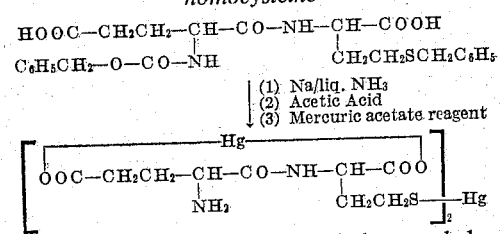

A glass vessel is flame dried and then cooled under nitrogen. About 100 ml. of liquid ammonia (commercial grade) is distilled from sodium into the reaction vessel. An addition is made of 0.7 g. (0.0014 mole) of N-carbobenzyloxy-L-α-glutamyl-S-benzyl-DL-homocysteine. Sodium amounting to 0.3 g. (0.13 mole) is added which produces a persistent blue color. The mixture is stirred about 20 minutes and 1.0 g. of ammonium acetate is added. Ammonia is then evaporated at room temperature. The solid residue is taken up in 0.5N acetic acid and mercuric acetate reagent (a solution of 50 g. of mercuric acetate dissolved in 200 ml. of 0.5N acetic acid) is added until no more precipitate forms. The precipitate is removed by centrifugation, and 1N aqueous sodium hydroxide is added to the supernatant solution until no further precipitate is observed. This precipitate is removed by centrifugation and combined with the previous precipitate. Addition of mercuric acetate reagent to the decantate did not produce more precipitate. The mercuric salt of the dipeptide is suspended in water and hydrogen sulfide is passed in for about five hours. The mercuric sulfide which forms is removed by filtration through a pressure filter under nitrogen. The solution is lyophilized and the resulting solid is analyzed. The analysis indicates that inorganic salts are still present. The product is then dissolved in 0.5N acetic acid and treated with mercuric acetate reagent (prepared by dissolving 50 g. of mercuric acetate in 20 ml. of glacial acetic acid and diluting with 200 ml. of 0.5N glacial acetic acid) until precipitation is complete. The precipitate is removed by filtration, washed with methanol, and with three 15-ml. portions of water. The dry mercuric salt of L-α-glutamyl-DL-homocysteine amounts to 0.37 g., corresponding to a 46% yield.

*Analysis.*—Calculated for $C_{18}H_{30}N_4S_2O_{10}Hg_3$: N, 4.97%; S, 5.68%. Found: N, 4.95%, 4.75; S, 5.40%, 5.63.

*Example XII.—L-α-glutamyl-DL-homocysteine*

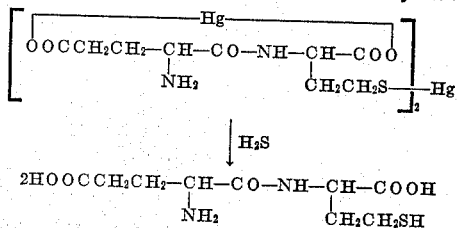

Hydrogen sulfide is bubbled into a suspension of 0.30 g. (0.00268 mole) of the mercuric salt of L-α-glutamyl-DL-homocysteine (Example XI) in 50 ml. of oxygen-free water for four hours. The mercuric sulfide which forms is removed by pressure filtration and washed with three 5-ml. portions of water. The combined filtrate and washings are lyophilized. The L-α-glutamyl-DL-homocysteine obtained melts at 118–120° C.

*Analysis.*—Calculated for $C_9H_{16}N_2O_5S$: N, 10.61%; S, 12.13%. Found: N, 9.67%; S, 12.40%.

*Example XIII.—Diethyl N-carbobenzyloxy-S-benzyl-DL-homocysteinyl-L-glutamate*

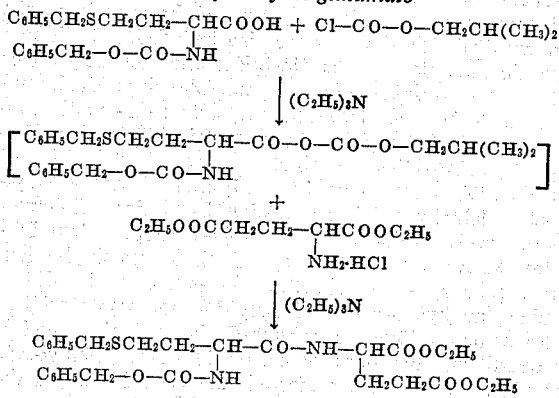

The general procedure of Example I, Part C is followed. N-carbobenzyloxy-S-benzyl-DL-homocysteine, 7.19 g. (0.02 mole) is dissolved in 100 ml. of dioxane and 2.22 g. (0.022 mole, 10% excess) of triethylamine is added. The solution is cooled to 10° C. and 3.01 g. (0.022 mole, 10% excess) of isobutyl chloroformate is added. The mixture is stirred for ten minutes, and the precipitate of triethylamine hydrochloride is removed by filtration from the solution of the mixed anhydride.

To a solution of 4.80 g. (0.02 mole) of diethyl glutamate hydrochloride in 100 ml. of dioxane there is added 2.22 g. (0.022 mole, 10% excess) of triethylamine. The precipitate of triethylamine hydrochloride is removed by filtration. The solution of diethyl glutamate is added to the solution of the mixed anhydride during a period of twelve minutes at 10° C. Stirring is continued at 10° C. for two hours and then at room temperature for two hours.

The reaction mixture is filtered and the solvent is removed from the filtrate by distillation under vacuum. The diethyl N - carbobenzyloxy - S - benzyl - DL - homocysteinyl-L-glutamate obtained by recrystallization from ethyl acetate-hexane amounts to 3.75 g., M. P. 85–87° C.

*Analysis.*—Calculated for $C_{28}H_{36}N_2SO_7$: C, 61.74%, H, 6.66%; N, 5.16%. Found: C, 61.61%; H, 6.49%; N, 5.20%, 5.31.

*Example XIV.—N-carbobenzyloxy-S-benzyl-DL-homocysteinyl-L-glutamic acid*

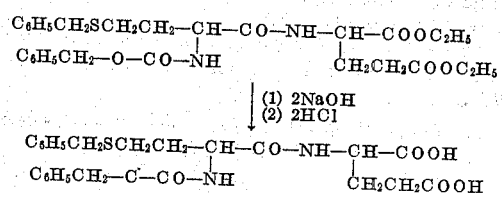

A reaction vessel is charged with 14.15 g. (0.026 mole) of diethyl N-carbobenzyloxy-S-benzyl-DL-homocysteinyl-L-glutamate, 57.2 ml. (0.0572 mole, 10% excess) of 1N aqueous sodium hydroxide and 141.5 ml. of dioxane. The solution is allowed to stand at room temperature (about 25° C.) for 1¼ hours. There is added 57.2 ml. (0.0572 mole) of 1N hydrochloric acid. The solvent is removed at 40° C. at a pressure of 15 mm. of mercury. The residue is taken up in 125 ml. of ethyl acetate and the solution is decanted from the undissolved salt. The ethyl acetate solution is extracted with three 40-ml. portions of saturated aqueous sodium bicarbonate solution. The bicarbonate solution is extracted with two 40-ml. portions of ether. The bicarbonate solution is cooled and acidified to Congo red paper with 3N hydrochloric acid. The product which separates as an oil is taken up in ethyl acetate, and dried over magnesium sulfate. The ethyl acetate is removed at 40° C. at 15 mm. pressure of mercury. The solid is taken up in dioxane and lyophilized. The N - carbobenzyloxy - S - benzyl-DL-homocysteinyl-L-glutamic acid amounts to 11.08 g. and melts at 65–67° C.

*Analysis.*—Calculated for $C_{24}H_{28}N_2SO_7$: N, 5.74%; S, 6.56%. Found: N, 5.79%, 5.66%; S, 6.61%, 6.54%.

*Example XV.—DL-homocysteinyl-L-glutamic acid*

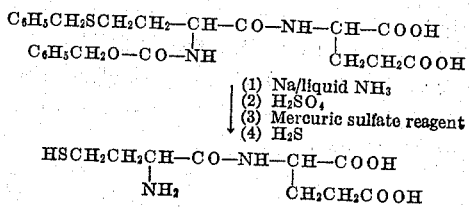

The general procedures of Examples VI and VII are followed. A glass reaction vessel is flame dried, and cooled under nitrogen. About 250 ml. of liquid ammonia (commercial grade) is distilled from sodium into the reaction vessel and 10.78 g. (0.022 mole) of N-carbobenzyloxy-S-benzyl-DL-homocysteinyl-L-glutamic acid is added to the ammonia. An additional 125 ml. of liquid ammonia is added to achieve complete solution. Sodium is added in small portions until a deep blue color persists, 2.44 g. (0.106 mole) being required. The mixture is stirred for 25 minutes and 5.69 g. (0.106 mole) of ammonium chloride is added. The ammonia is evaporated at room temperature. The residue is taken up in 50 ml. of cold, oxygen-free water and 160 ml. of 0.5N sulfuric acid is added. Mercuric sulfate reagent, prepared as described in Biochemical Preparations 2, 88 (1952) is added until there is no further precipitate. The precipitate is isolated by filtration and washed with ten 100-ml. portions of water to remove inorganic salts.

The mercuric salt of DL-homocysteinyl-L-glutamic acid is suspended in 125 ml. of oxygen-free water and hydrogen sulfide is passed into the suspension for 21 hours. The mercuric sulfide which forms is removed by filtration through a pressure filter under a nitrogen atmosphere. The mercuric sulfide is washed with five 10-ml. portions of oxygen-free water and the washes combined with the filtrate. The solution containing the dipeptide is freed from hydrogen sulfide by bubbling nitrogen through the solution. Inorganic sulfate is precipitated by the addition of 0.1N barium hydroxide solution. The barium sulfate is removed by filtration and the filtrate is lyophilized. The DL-homocysteinyl-L-glutamic acid monohydrate amounts to 3.8 g.

*Analysis.*—Calculated for $C_9H_{16}N_2SO_5 \cdot H_2O$: N, 9.93%; S, 11.36%. Found: N, 9.64%, 9.47%; S, 11.21%, 11.19%.

*Example XVI.—N-carbobenzyloxy-S-benzyl-DL-homocysteinyl-D-valine*

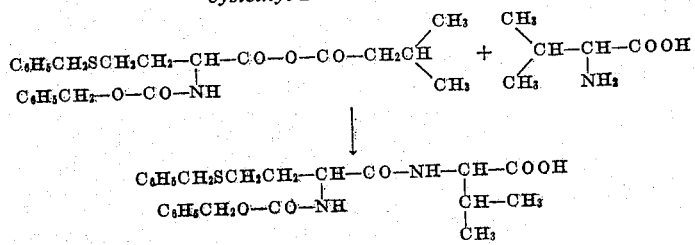

The procedures which are described in Example I, Part C are used to prepare the mixed anhydride from 28.76 g. (0.08 mole) of N-carbobenzyloxy-S-benzyl-DL-homocysteine, 12.10 g. (0.088 mole, 10% excess) of isobutyl chloroformate, and 8.98 g. (0.088 mole, 10% excess) of triethylamine, using 200 ml. of tetrahydrofuran as solvent. A solution of 9.3 g. (0.08 mole) of D-valine in 80 ml. (0.08 mole) of 1N aqueous sodium hydroxide is added to the mixed anhydride solution during 15 minutes, keeping the temperature at −5° C. The reaction mixture is stirred an additional 15 minutes at −5° C. and 1½ hours at room temperature. The mixture is acidified to Congo red paper with 1N hydrochloric acid and the oil which forms is taken up in ethyl acetate. The ethyl acetate solution is dried over magnesium sulfate and concentrated at a pressure of 15–25 mm. of mercury. The N-carbobenzyloxy-S-benzyl-DL-homocysteinyl-D-valine amounts to 11.5 g.

*Analysis.*—Calculated for $C_{24}H_{30}N_2SO_5$: N, 6.11%; S, 6.99%. Found: N, 6.14%, 6.03%; S, 7.00%, 6.74%.

*Example XVII.—DL-homocysteinyl-D-valine*

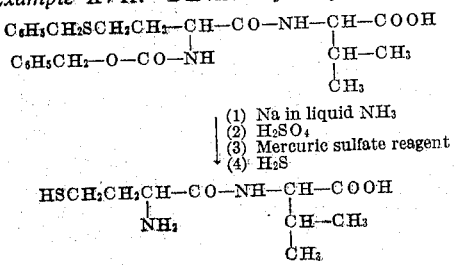

The general procedures described in Examples VI and VII are followed. A reaction vessel containing 11.5 g. (0.0251 mole) of N-carbobenzyloxy-S-benzyl-DL-homocysteinyl-D-valine is charged with 150 ml. of liquid ammonia (commercial grade, distilled from sodium). Sodium is added in small portions until a deep blue color persists, 2.29 g. (0.0995 mole) being required. The solution is stirred for 25 minutes and 5.34 g. (0.0995 mole) of ammonium chloride is added. Stirring is continued in the solid carbon dioxide/acetone bath for 20 minutes, then the ammonia is evaporated at room temperature. The dry residue is taken up in 125 ml. of cold 0.5N sulfuric acid and filtered under nitrogen pressure. Mercuric sulfate reagent is added to the solution until there is no further precipitate. The mercuric salt of DL-homocysteinyl-D-valine is isolated by centrifugation, separated into two parts and each part washed with twelve 20–30-ml. portions of water to remove inorganic salts.

The mercuric salt of DL-homocysteinyl-D-valine is suspended in 150 ml. of oxygen-free water and hydrogen sulfide is passed into the suspension for 17 hours. The mercuric sulfide is removed by filtration and washed with four 5-ml. portions of oxygen-free water. The washes and filtrate are combined and freed from hydrogen sulfide by bubbling nitrogen through the solution. The solution of the dipeptide is treated with 0.1N barium hydroxide solution to precipitate inorganic sulfate. The barium sulfate is removed by filtration and the filtrate is lyophilized. The DL-homocysteinyl-D-valine obtained amounts to 1.8 g.

The above examples have illustrated the invention with respect to heterodipeptides of homocysteine with certain amino acids and with respect to such dipeptides having their amino, thiol, and carboxyl groups protected. The invention is, however, generic to dipeptides of homocysteine with other open-chain α-amino acids, and derivatives of such dipeptides having their functional groups protected by ester, amide, carbamate or thioester or benzylthioether groups, and their disulfides or salts in general. The various optical enantiomorphs, i. e., the D- and the L-enantiomorphs and the optically inactive mixture of isomers or the racemic compound of the enantiomorphs known as the DL-isomers are also included. Additional specific examples of such dipeptides and their derivatives included in this invention are the following: DL-homocysteinyl-DL-cysteine, L-homocysteinyl-L-alanine, DL-homocysteinyl-D-valine, L-homocysteinyl-D-leucine, DL-homocysteinyl-DL-norleucine, D-homocysteinyl-D-isoleucine, DL-homocysteinyl-DL-α-lysine, L-homocysteinyl-L-phenylalanine, L-homocysteinyl-L-tyrosine, D-homocysteinyl-L-arginine, S-acetyl-N-carbobenzyloxy-DL-homocysteinylglycine, S-benzyl-D-homocysteinyl-D-leucine, S-benzyl-N-carboethoxy-DL-homocysteinyl-DL-ε-lysine, methyl S-benzyl-N-acetyl-DL-homocysteinyl-DL-norleucinate, D-homocysteinyl-D-phenylalanine hydrobromide, and the mercury salt of DL-homocysteinyl-DL-alanine. Among the preferred subgenera is that of the heterodipeptides of homocysteine with an α-amino carboxylic acid which is saturated aliphatic hydrocarbon except for one amino group alpha to carboxyl and for not more than two carboxyl groups, particularly α-aminoalkanoic acids.

The blocking, or protecting, of the amino groups during the synthesis of the dipeptides of this invention has been illustrated in the examples by the use of the carbobenzyloxy,

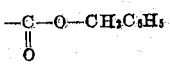

group since this particular blocking group is of quite general utility, especially when it is desired to prepare dipeptides having free amino groups, and when it is desired to minimize racemization of optical isomers. However, other amine blocking groups can be used in some cases if desired. Examples of other amine protecting groups which can be used include carboallyloxy,

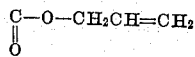

carboethoxy,

and simple acyl groups such as, for example, benzoyl, acetyl, phthaloyl, and p-toluenesulfonyl groups. The carbobenzyloxy group can be removed by various methods, for example, by catalytic hydrogenation, or by treatment with sodium in liquid ammonia, by phosphonium iodide, or by hydrogen iodide or hydrogen bromide in glacial acetic acid or dioxane, and is therefore preferred when free dipeptides are desired. The benzoyl and carboethoxy groups can be removed only by hydrolysis and for this reason are used only in special cases.

The protection of the carboxyl group in the amino acids which are to be coupled by peptide linkages is preferably accomplished by the formation of ester groups. For this purpose, methyl, ethyl, or benzyl ester groups are usually selected. The methyl and ethyl esters are usually converted to the free acid by careful saponification after the peptide has been formed. However, benzyl ester blocking groups can frequently be removed by catalytic hydrogenolysis. By this latter method, a peptide having an amino group protected by a carbobenzyloxy group and a carboxyl group protected by a benzyl ester group can be converted to the free dipeptide in one step by catalytic hydrogenation. The carboxyl can also be protected by forming the amide thereof.

The free mercapto group in the homocysteinyl moiety of the dipeptides of this invention can be protected by any group which can be removed by reduction. Suitable groups of this type are the thioester and benzylthioether groups. Specific examples of operable thioester groups include acetylthio, benzoylthio, and phthaloylthio groups. Such groups are readily reduced to free mercapto groups by reaction with sodium in liquid ammonia. The removal of the thioester and benzylthioether groups may be easily verified by paper chromatography. The preparation of paper chromatograms and detection of free mercapto groups by means of alkaline sodium nitroprusside reagent is described by Toennies and Kolb in Anal. Chem. 23, 823 (1951).

The coupling of the homocysteinyl derivative with another α-amino acid derivative has been illustrated in the examples by the method involving the reaction of a mixed carbonic-carboxylic anhydride of one of the protected α-amino acids with the amino group of the other protected α-amino acid. This method is preferred since (a) the reaction proceeds under mild conditions, i. e., low temperatures and in neutral solutions, (b) the reaction proceeds rapidly and without racemization of optical isomers, and (c) since good yields of pure products are obtained. However, mixed anhydrides of the protected homocysteine, or other protected open-chain α-amino acid, with other types of acids can be used if desired. For example, mixed anhydrides of the homocysteinyl derivative with carboxylic acids can be prepared by reaction of the amino acid derivative with an acyl chloride, e. g., benzoyl chloride and isovaleryl chloride. Still other mixed anhydrides prepared from the protected amino acids and chlorophosphite esters, or mono- or diesters of phosphoric acid can be used in coupling the amino acids.

The homocysteinyl-α-amino acid peptides of this invention possess important advantages over the known cysteinyl α-amino acid dipeptides. For example, S-benzyl-L-cysteinylglycine is soluble in water to the extent of one part of the peptide in four parts of water. On the other hand, S-benzyl-DL-homocysteinylglycine has a water solubility of only one part in 400 parts of water. This unexpected low solubility of the homocysteinyl derivative makes it quite valuable for use in those applications requiring a water-insoluble dipeptide. For example, the homocysteinyl dipeptide exhibits greater resistance than the cysteinyl derivative against washing off by rainfall when it is applied to the surfaces of plants as a fungicide, etc.

The dipeptides of homocysteine and another open-chain α-amino acid are useful for various purposes. They are especially valuable as intermediates in the synthesis of higher polypeptides, for example, in the synthesis of the tripeptides of homocysteine with glycine and aspartic or glutamic acid as described in our application Serial No. 426,559, filed April 29, 1954. In this synthesis a dipeptide of homocysteine with glycine, aspartic acid or glutamic acid is condensed, by methods shown above for the preparation of dipeptides, with the necessary third component to form the tripeptide or its suitably protected derivatives.

The dipeptides of this invention also possess unexpected biological activity. For example, L-α-glutamyl-DL-homocysteine inhibits glutathione in the reaction in which the enzyme glyoxalase, in the presence of glutathione, oxidizes methylglyoxal to lactic acid. In this reaction, illustrated by the equation

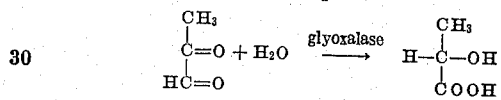

the glyoxalase requires gutathione for its action. The reaction can be followed by allowing the enzyme to act upon methyl glyoxal in the presence of bicarbonate-carbonic acid buffer. The lactic acid which is formed releases carbon dioxide, and the increase in volume is measured manometrically.

Using purified glyoxalases I and II prepared from baker's yeast and beef liver according to the method described by E. Racher, J. Biol. Chem. 190, 685–696 (1951), L-α-glutamyl-DL-homocysteine stimulated the glyoxalase system to only a very small degree, and markedly reduced the stimulation caused by glutathione. This behavior is indicated by the data in the following table.

| Addition to Glyoxalase System | $CO_2$ Produced in 15 Minute Reaction in Microliters |
|---|---|
| No additions | 10 |
| 50 μg. glutathione (GSH) | 440 |
| 4,900 μg. L-α-glutamyl-DL-homocysteine | 67 |
| 50 μg. GSH+4,900 μg. L-α-glutamyl-DL-homocysteine | 287 |

Since these glutamyl homocysteines inhibit the glutathione reaction, they can be used to interrupt processes catalyzed by glutathione. Thus, the undesirable types of growth, such as weeds and the fungal and bacterial diseases of plants, can be retarded. Thus ethyl N-carbobenzyloxy-S-benzyl-DL-homocysteinylglycinate, N-carbobenzyloxy-S-benzyl-DL-homocysteinylglycine, S - benzyl-DL-homocysteinylglycine, and ethyl S-benzyl-DL-homocysteinyl-glycinate hydrobromide retard early blight in tomato plants.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A dipeptide of homocysteine with a naturally occurring open chain α-amino alkane carboxylic acid.

2. A homocysteinylglycine.
3. DL-homocysteinylglycine.
4. A glutamylhomocysteine.
5. L-α-Glutamyl-DL-homocysteine.
6. A dipeptide of homocysteine and glycine.
7. A dipeptide of homocysteine and glutamic acid.
8. A dipeptide of homocysteine with a naturally occurring α-aminoalkanoic acid.
9. A dipeptide of homocysteine with a naturally occurring aminocarboxyalkane wherein the only substituents on the alkane are one amino group and not more than two carboxyl groups, the one amino group being on carbon alpha to carboxyl.
10. DL-Homocysteinyl-L-glutamic acid.
11. DL-Homocysteinyl-D-valine.
12. A dipeptide of homocysteine with an alpha amino acid of the class consisting of glycine, valine, and glutamic acid.

References Cited in the file of this patent

UNITED STATES PATENTS 2,498,665   Emerson _____ Feb. 28, 1950

OTHER REFERENCES

Anson et al.: "Advances in Protein Chem.," vol. 5, pp. 44, 54 (1949).

Hess et al.: J. Biol. Chem., vol. 149, pp. 543–8 (1943).